United States Patent [19]
Clapper et al.

[11] Patent Number: 4,735,732
[45] Date of Patent: * Apr. 5, 1988

[54] FILTRATION CONTROL ADDITIVE FOR INVERT EMULSION DRILLING FLUIDS AND METHOD OF PREPARATION

[75] Inventors: Dennis K. Clapper, Houston; Darrell P. Salisbury, Sugarland, both of Tex.

[73] Assignee: Milchem Incorporated, Houston, Tex.

[*] Notice: The portion of the term of this patent subsequent to Mar. 1, 2005 has been disclaimed.

[21] Appl. No.: 798,965

[22] Filed: Nov. 18, 1985

[51] Int. Cl.$^4$ ............................................. C09K 7/06
[52] U.S. Cl. .............................. 252/8.511; 252/8.515; 252/8.551; 260/404
[58] Field of Search .......... 252/8.5 M, 8.5 P, 8.55 R, 252/308, 8.511, 8.515, 8.551

[56] References Cited

U.S. PATENT DOCUMENTS 3,168,475  2/1965  Jordan et al. ................... 252/8.5
3,671,427  6/1972  Andrews et al. .............. 252/8.55 X
4,421,655 12/1983  Cowan ........................... 252/8.5
4,597,878  7/1986  House et al. ................... 252/8.5

Primary Examiner—Herbert B. Guynn
Attorney, Agent, or Firm—Norvell & Associates

[57] ABSTRACT

The present invention relates to a filtration control additive for use in invert emulsion drilling fluids; the method of preparing such additives; the invert emulsion drilling fluid produced therefrom; and a method of drilling, completing, and working over a subterranean well, utilizing such drilling fluid containing the filtration control additive which is utilized in a water-in-oil, emulsion-type subterranean drilling fluid. The additive comprises the pyrolyzed product obtained by intermixing and heating a finely divided humic acid-containing material and a primary amine having an alkyl radical of 10 to 20 carbon atoms or a primary amine having one alkyl-substituted phenyl radical, the alkyl radical having 10 to 20 carbon atoms. The amine may also be a secondary amine having at least one alkyl radical of 8 to 20 carbon atoms.

1 Claim, No Drawings

FILTRATION CONTROL ADDITIVE FOR INVERT EMULSION DRILLING FLUIDS AND METHOD OF PREPARATION

BACKGROUND OF THE INVENTION

1. Field of the Invention

The present invention relates to drilling fluids utilized in the drilling of subterranean oil and gas wells, and more particularly to a filtration control additive for use in invert emulsion drilling fluids and preparing water-in-oil, emulsion-type drilling fluids; the method of preparation of the additive, and the method of their use in drilling such wells.

2. Description of the Prior Art

As is known in the art, a rotary system is the most common form of drilling subterranean wells, especially those to obtain hydrocarbons from relatively deep, producing formations. The rotary system depends upon rotation of a lengthy column of drill pipe, to the bottom of which is attached a multifaced drilling bit which serves to cut into the earth formation. As the drilling continues, the cuttings from the drilling bit accumulate in the well and must be removed in order to continue the drilling. A drilling fluid is commonly used to carry such cuttings to the surface for removal to allow the bit to continue its functioning. The bottom of the hole thus formed must be kept clean and free of cuttings at all times in order to facilitate efficient drilling. It is also known that drilling systems other than the aforesaid rotary system are sometimes employed in drilling operations; however, all such systems still require a drilling fluid to remove bore hole cuttings and to otherwise perform functions related to drilling fluids. In many situations, what is generally referred to as a "drilling fluid" actually may be utilized with either no modification or only minor modification as a fluid for use in conjunction with completing or working over a subterranean well. In this connection, utilization of the phrase "drilling fluid", as used herein, contemplates the use of such fluid in completion and work-over operations in subterranean wells as well as in the initial drilling operations.

Although aqueous-based drilling fluids which utilize clear water, brine, saturated brine, or sea water as the primary liquid base constituent may be found to be dominant within some facets of the drilling industry, there is a considerable need for drilling fluids wherein a hydrocarbon liquid forms the primary liquid constituent, particularly in instances in which the drilling fluid is utilized in higher temperature wells which are drilled to greater depths than heretofore experienced.

Hydrocarbon-based drilling fluids normally are defined as invert emulsion, or water-in-oil emulsion drilling fluids. Such emulsions provide droplets of water which are typically dispersed in a continuous phase of oil. The oil, or continuous phase, typically will comprise a hydrocarbon such as mineral oil, diesel oil, crude oil, kerosene, or the like. The amount of such oil commonly used will be within the range of about 60 to 90 parts by volume and preferably within the range of about 70 to 90 parts by volume on the basis of 100 parts equaling the total liquid phase of the drilling fluid. The concentration of the selected hydrocarbon depends upon the particular application and earth formations for which the water-in-oil drilling fluid is to be utilized.

The dispersed liquid phase of the drilling fluid is commonly referred to as the "water phase" and may consist of fresh water, salt water, sea water, or saturated brine. Normally the presence of typical amounts of sodium chloride, calcium chloride, calcium carbonate, or calcium sulfate salts will have little effect on the stability of the emulsion which is typically produced. The water concentration will normally be in the range from between about 5 to 40 parts by volume and more commonly will be within the range of about 10 to 30 parts by volume on the basis of 100 parts equaling the liquid phase of the drilling fluid composition. As aforesaid, the exact concentration depends upon the particular application for which the invert emulsion drilling fluid is to be utilized.

The liquid hydrocarbons normally serve as a continuous liquid vehicle to be converted into a drilling fluid having desirable properties for the desired applications by adding various materials to thicken the fluid so that it will support cuttings and provide a low fluid loss when the fluid is subjected to filtration against a permeable formation and in addition to increase the density of the fluid. The fluids of the present invention are greatly improved for the aforesaid purposes and also have been found useful in certain other types of well-working operations. As is known, oil-bearing sands of low permeability are commonly subjected to extremely high fluid pressures in order to crack them open along bedding planes and the fractures so formed are held open by solid propping agents introduced with the fracturing fluid. In such use, it is desirable to employ an oil base fluid having low filtration loss, and in many cases it is also necessary to fill the annular space between the casing and the walls of the hole to facilitate most efficient production. It is also advantageous to use an oily fluid to minimize corrosion and to provide low fluid loss characteristics over lengthy time periods wherein the packing fluid remains in place. These operations involving drilling, fracturing, and packing are well-working operations; and the oil base well-drilling fluids, well-fracturing fluids, and well-packing fluids are all termed "oil base well-working fluids", as used in the following specification and claims. In recent years, additives for the control of fluid loss have not been able to adequately control fluid loss at high bottom hole temperatures. This has resulted in increased additive consumption to maintain mud properties, thus increasing system costs. The fluids which are obtainable in accordance with our invention are characterized by extremely low filtrate loss after high temperature aging and the additives which are the subject matter of this invention are based on humic acid of such nature that undue thickening does not occur before fluid loss is lowered to an acceptable level.

Humic acid is a material of wide distribution being present in soils, peat, and soft coals; especially coals known as lignite or brown coal, as well in the mineral leonardite. While its precise chemical structure is not completely understood, it is a generally uniform material which represents a naturally occurring product of degradation, such as leaves, wood, and similar vegetable organic matter. It is an acid in which both carboxyl and phenolic hydroxy groups contribute to its base combining ability. It is soluble in alkalis such as caustic soda and sodium carbonate, has a deep brown color, and is readily soluble in water when converted to alkali metal salts. Leonardite and lignite provide a common source of such humic acid which occurs in sizable deposits in the United States, especially in the western states.

U.S. Pat. Nos. 3,168,475 and 3,281,458 to Jordan et al relate to well drilling fluids in which substituted ammonium humates are utilized. The process employs such materials wherein the fluid is subject to loss of oil by filtration. U.S. Pat. No. 3,775,447 to Andrews et al relates to lignite products and compositions thereof, and more particularly to the reaction products of humic acid with long chain fatty acyl partial amides of polyalkylene polyamine for use in compounding oil base well working fluids. Also, U.S. Pat. No. 3,671,427 to Andrews et al relates to humic acid with long chain fatty acyl partial amines of a polyalkylene polyamine, the humic acid being reacted with the long chain alkyl ammonium cation for use in an oil base well-drilling fluid.

U.S. Pat. Nos. 3,538,071 and 3,671,428 to Kim relate to lignin derivatives for use in oil base drilling muds wherein an oxidized lignin is reacted with an amine to form a salt.

While the foregoing prior art discloses various amine salts of humic acid, none are produced by the method disclosed in the present application, and none have the chemical and physical characteristics of the subject reaction products for use as a filtration control additive for drilling fluids as first disclosed herein.

SUMMARY OF THE INVENTION

The present invention relates to the preparation and utilization of a unique composition which is useful as a filtrate control additive for inclusion in drilling fluids and in the formulation of water-in-oil drilling fluids for subterranean wells. The primary function of the subject additive is its use in preparing a drilling fluid having decreased fluid loss rates over those available in the prior art.

A significant advantage of the present invention is that when used at relatively low concentrations, the additive in conjunction with emulsifiers serves to produce a thermally stable emulsion as evidenced by the lack of free water in the high-temperature, high-pressure (HTHP) filtrates. The use of lower concentration of the additive is markedly more cost-effective. The additive of the present invention can be used in conjunction with primary emulsifiers such as tall oil soaps in mud systems where additional filtration control is desired.

The filtration control additive of the present invention consists of the pyrolyzed product obtained by intermixing and heating a finely divided humic acid-containing material and a primary amine having an alkyl radical ranging from about 10 to 20 carbon atoms or a primary amine having one alkyl-substituted phenyl radical, the alkyl radical having 10 to 20 carbon atoms. The amine may also be a secondary amine having at least one alkyl radical of 8 to 20 carbon atoms. The pyrolysis is completed in an enclosed reaction chamber having a controlled atmosphere such as an inert gas or carbon dioxide gas. The resulting pyrolysis product has a high thermal stability in drilling fluids at temperatures of not less than about 230° C. and possesses improved filtration control properties. Although the exact chemical nature of the pyrolysis product has not been determined, it is recognized by those skilled in the art that amides are formed by the pyrolysis of primary or secondary amine salts of carboxylic acids. Heating the mixture of amine and humic-acid containing material results initially in salt formation between the amine and the carboxylic acid groups of humic acid. Further heating of the amine salts of humic acid converts some and possibly all of the amine salts to amides. Because of the extent of amide formation has not been determined, the products of this invention will be referred to by the term "pyrolysis products". The humic acid-containing material preferably comprises leonardite or lignite which is ground into fine particle size and reacted with the primary or secondary amine in the reaction chamber under controlled atmospheric conditions while heating the reactants to a temperature from about 185° C. to the decomposition temperature of the resultant pyrolysis products. The preferred humic acid material is leonardite, which is ground into fine particle size, ranging from about $-20$ to $-200$ U.S. mesh. The primary amine consists of a long chain, fatty amine having an alkyl radical ranging from 10 to 20 carbon atoms or a primary amine having one alkyl-substituted phenyl radical, the alkyl radical having 10 to 20 carbon atoms. The amine may also be a secondary amine having at least one alkyl radical of 8 to 20 carbon atoms. The amine is preferably selected from the group consisting of octadecyl amine, soya amine, tall oil amine, tallow amine, oleyl amine, vegetable oil amine, coco amine, and dodecyl amine. The preferred weight ratio of dry leonardite to amine ranges from about 2:1 to 5:1 and the materials are preferably reacted in the pyrolysis chamber under a controlled atmosphere of either an inert gas or carbon dioxide gas. The resultant pyrolyzed amine salts of humic acid may be used in minor amount as the filtration control additive in drilling fluids which are capable of withstanding well temperatures in the range of up to about 200° to 230° C., and may be used in both diesel oil-based or mineral oil-based drilling fluid systems.

DESCRIPTION OF THE PREFERRED EMBODIMENTS

In the preparation of the filtration control additive and emulsion composition utilized in the present invention, a humic acid-containing material such as leonardite or lignite is reacted with a primary or secondary amine. The humic-acid material was finely ground to a fineness ranging from about $-20$ to $-200$ U.S. mesh. Primary amine salts of leonardite were pyrolyzed at various temperatures in stainless steel bombs. Although most reactions were conducted at 200° C. for 16 hours, other reactions were performed at 250°, 275°, 300° C.; the required reaction time being decreased to 3 hours at 300° C.

Salts of primary and tertiary amines were made by reacting an amine with dry $-30$ mesh leonardite in a warm methanol slurry. As an example, a one liter Erlenmeyer flask was charged with 250 ml methanol and 30 grams octadecylamine. The mixture was warmed in a 50°-60° C. water bath to dissolve the octadecylamine. After the octadecylamine was dissolved, the light yellow solution was charged with 90 grams dry $-30$ mesh leonardite. The slurry was stirred magnetically for 2 hours while being kept warm with the water bath. The resultant black slurry was filtered through an 11 cm Buchner funnel, and the solid was washed with three 50 ml portions of warm methanol. After the methanol had evaporated, the black-brown solid was dried in a 100° C. oven for 2 hours. The dry weight of amine salt was 113.5 grams. The resultant product was ground to a fine powder with a grinder.

Quaternary ammonium salts were also made. As an example, 86 grams, −30 mesh leonardite (approximately 60 grams dry weight) were added to a solution of 5.5 grams sodium hydroxide dissolved in 500 ml water. The black solution was stirred magnetically for thirty minutes. The pH of the solution was 8.85 as determined by a pH meter. The leonardite solution was charged with a solution of 60 grams of trimethyloctadecyl ammonium chloride (50% strength) dissolved in 200 ml water. An immediate gelatinous precipitate formed. After the slurry was mixed for 30 minutes to pH of the mixture was adjusted to 6.5 by the addition of approximately 4.5 ml 6M hydrochloric acid. The slurry was centrifuged for 15 minutes at 2000 rpm using a standard centrifuge and the supernatant liquid was decanted. The solid residue was filtered on a 15 cm Buchner funnel and washed with three 100 ml portions of methanol. After the methanol had evaporated the product was placed in a 60°–70° C. oven for 2.5 hours. The dry weight was 81.6 grams. The product was ground to a fine powder with a grinder.

In the salt pyrolysis a 500 ml stainless steel bomb was charged with the previously prepared amine salt made by the aforesaid methanol slurry procedure. The bomb was flushed with nitrogen and placed in a hot oven. In most cases the bombs were placed in a 200° C. oven for 16 hours. After the bomb was removed from the oven it was vented to release steam generated by the pyrolysis.

In the dry process a 500 ml stainless steel bomb was charged with a mixture of the selected amine and −60 mesh leonardite. The bomb was purged with nitrogen and placed in a 200° C. oven for 16 hours. The bomb may be charged with nitrogen or carbon dioxide gas, the latter being preferred. Following preparation of the pyrolysis product, the bomb was then removed and vented.

The amine taken for pyrolysis reaction with leonardite was preferably a long chain fatty amine having from 10 to 20 carbon atoms. The amine consisted of octadecyl amine, soya amine, tall oil amine, tallow amine, oleyl amine, vegetable oil amine, or cocoa amine. Other primary or secondary amines can also be used for the reaction. The resultant pyrolysis products are hereinafter referred to as fluid loss additives in their evaluation in invert emulsions.

To demonstrate the superiority of the pyrolysis products over the leonardite-amine salts the various additives were tested in both diesel oil and mineral oil mud systems. The relatively poor performance of the salts in HTHP filtrate tests is demonstrated in Tables 1–4. The HTHP data were obtained after only 16 hours of aging at 200° C.

The results of diesel oil mud testing of amine salts of leonardite are shown in Tables 1, 2 and 3. The fluid loss additives were evaluated at a concentration of 12 lb/bbl in an oil-based invert emulsion mud having an 80:20 oil/water ratio weighted to 12 lbs/gal containing 2.7 gal/bbl of a primary emulsifier (oxidized tall oil); 17 lbs/bbl of alkaline earth oxide; 0.72 gal/bbl of a secondary emulsifier (polyamide type); 4.5 lb/bbl of an organophilic clay. The oil phase was #2 diesel oil and the water phase was a 30 weight percent calcium chloride brine solution. The drilling fluids were mixed 30 minutes in a Gifford-Wood homogenizer mixer. The mud samples were hot rolled for 16 hours at 200° C. before determining API, RP 13B 30 minute fluid loss at 150° C. and 500 psi (except where noted). The fluid loss evaluation was conducted in accordance with the API standard procedure for field testing drilling fluids, designated as API RP 13B Eleventh Edition dated May 1, 1985.

TABLE 1

FILTRATION CONTROL PROPERTIES OF 80:20, 12 LB/GAL DIESEL OIL MUDS USED TO EVALUATE PRIMARY AMINE SALTS OF LEONARDITE

| Amine | Leonardite/Amine Ratio | 150° C. HTHP, cm³ Total | Free Water |
|---|---|---|---|
| Octadecyl | 2/1 | 34 | — |
| Octadecyl | 3/1 | 52* | — |
| Octadecyl | 4/1 | 66* | — |
| Octadecyl | 5/1 | 66* | — |
| Octadecyl | 8/1 | 84 | 0.8 |
| Tallow | 3/1 | 34 | — |
| Oleyl | 3/1 | 48 | — |
| Coco | 3/1 | 68 | 2.0 |

*20 minutes HTHP

TABLE 2

FILTRATION CONTROL PROPERTIES OF 80:20, 12 LB/GAL DIESEL OIL MUDS USED TO EVALUATE TERTIARY AMINE SALTS OF LEONARDITE

| Amine | Leonardite/Amine Ratio | 150° C. HTHP, cm³ Total | Free Water |
|---|---|---|---|
| Dimethyl octadecylamine | 3/1 | 54 | 0.4 |
| Dimethyl (hydrogenated tallow) amine | 3/1 | 74 | — |
| Dimethyl (hydrogenated tallow) amine | 2/1 | 62 | — |

TABLE 3

FILTRATION CONTROL PROPERTIES OF 80:20, 12 LB/GAL DIESEL OIL MUDS USED TO EVALUATE QUATERNARY AMINE SALTS OF LEONARDITE

| Amine | Leonardite/Amine Ratio | 150° C. HTHP, cm³ Total | Free Water |
|---|---|---|---|
| Dimethyl alkyl (C$_{12}$–C$_{16}$) benzyl ammonium chloride | 2/1 | 54 | 2.0 |
| Dimethyl alkyl (C$_{12}$–C$_{16}$) benzyl ammonium chloride | 1/1.37 | 14.4 | — |
| Dimethyl alkyl (C14–C18) benzyl ammonium chloride | 1.67/1 | 52 | — |
| Dimethyl alkyl (C14–C18) benzyl ammonium chloride | 1/1.6 | 4.4 | — |
| Trimethyloctadecylammonium chloride | 2/1 | 26 | — |
| Dimethyldi (hydrogenated tallow) ammonium chloride | 1.72/1 | 6.8 | — |

The amine salts of leonardite were also tested in a mineral oil mud system. With regard to the mud formulation and testing procedure, the fluid loss additives were evaluated at a concentration of 12 lb/bbl in an oil-based invert emulsion mud having an 80:20 oil/water ratio weighted to 12 lbs/gal containing 2.7 gal/bbl of a primary emulsifier (oxidized tall oil); 17 lb/bbl of alkaline earth oxide; 0.72 gal/bbl of a secondary emulsifier (polyamide type); 12 lb/bbl of an organophilic clay.

The oil phase was a mineral oil and the water phase was a 30% by weight calcium chloride brine solution. The drilling fluids were mixed 30 minutes in a Gifford-Wood homogenizer mixer. The mud samples were hot rolled for 16 hours at 200° C. before determining API, RP 13B 30 minute fluid loss at 150° C. and 500 psi.

The following Table 4 indicates the data obtained for such evaluation.

TABLE 4

FILTRATION CONTROL PROPERTIES OF 80:20, 12 LB/GAL MINERAL OIL MUDS USED TO EVALUATE AMINE SALTS OF LEONARDITE

| Amine | Leonardite/Amine Ratio | 150° C. HTHP, cm³ Total | Free Water |
|---|---|---|---|
| Octadecyl | 2/1 | 13.6 | — |
| Dimethyldi (hydrogenated tallow) ammonium chloride | 1.72/1 | 15.6 | — |
| Dimethyl alkyl ($C_{14}$-$C_{18}$) benzyl ammonium chloride | 1/1.6 | 10.4 | — |

The relatively poor performance of the leonardite-amine salts in HTHP filtration control is illustrated in Tables 1 to 4. The HTHP data were obtained after only 16 hours of aging at 200° C.

Tables 5 to 7 indicate the superiority of the pyrolysis products over the salts. Table 5 provides filtration data for pyrolyzed leonardite. The relatively poor filtration control provided by pyrolyzed leonardite indicates the importance of amine in the product formulation. Tables 5 and 6 show the effect of various ratios of leonardite to amine on filtration control. Table 7 indicates the effects of various amines reacted with leonardite in the same mole ratio. It should be noted that higher weight ratios of leonardite to amine were used with cocoamine and dodecylamine since these amines have lower molecular weights than the other amines.

Table 5 shows the results of fluid loss additives which were evaluated at a concentration of 12 lb/bbl in an oil-based invert emulsion mud having an 80:20 oil/water ratio weighted to 12 lbs/gal containing 2.7 gal/bbl of a primary emulsifier (oxidized tall oil); 17 lb/bbl of alkaline earth oxide; 0.72 gal/bbl of a secondary emulsifier (polyamide type); 4.5 lb/bbl of an organophilic clay. The oil phase was #2 diesel oil and the water phase was a 30 percent by weight calcium chloride brine solution. The drilling fluids were mixed 30 minutes on a Gifford-Wood homogenizer mixer. The mud samples were hot rolled for 64 hours at 200° C. before determining API, RP 13B 30 minute fluid loss at 150° C. and 500 psi (except where noted).

TABLE 5

FILTRATION CONTROL PROPERTIES OF 80:20, 12 LB/GAL DIESEL OIL MUDS USED TO EVALUATE SAMPLES PYROLYZED AT 200° C.

| Amine | Leonardite/Amine Ratio | 150° C. HTHP, cm³ Total | Free Water |
|---|---|---|---|
| Octadecyl | 2/1 | 3.2 | — |
| Octadecyl | 2.2/1 | 2.0 | — |
| Octadecyl | 2.6/1 | 3.6 | — |
| Octadecyl | 3/1 | 3.2 | — |
| Octadecyl | 6/1 | 19.2 | — |
| Soya | 3/1 | 2.4 | — |
| Soya | 4/1 | 12.8 | — |
| Soya | 5/1 | 12.0 | — |
| Tall oil | 3/1 | 3.6 | — |
| Tall oil | 4/1 | 7.6 | — |
| Tall oil | 5/1 | 19.6 | — |
| Pyrolyzed Leonardite (No Amine) | | 60 | 1.0* |

*18 min. HTHP

Table 6 shows the results of fluid loss additives which were evaluated at a concentration of 12 lb/bbl in an oil-based invert emulsion mud having an 80:20 oil/water ratio weighted to 12 lbs/gal containing 2.7 gal/bbl of a primary emulsifier (oxidized tall oil); 17 lb/bbl of alkaline earth oxide; 0.72 gal/bbl of a secondary emulsifier (polyamide type); 4.5 lb/bbl of an organophilic clay. The oil phase was a mineral oil and the water phase was a 30 percent by weight calcium chloride brine solution. The drilling fluids were mixed 30 minutes on a Gifford-Wood homogenizer mixer. The mud samples were hot rolled for 64 hours at 200° C. before determining API, RP 13B 30 minute fluid loss at 150° C. and 500 psi.

TABLE 6

FILTRATION CONTROL PROPERTIES OF 80:20, 12 LB/GAL MINERAL OIL MUDS USED TO EVALUATE SAMPLES PYROLYZED AT 200° C.

| Amine | Leonardite/Amine Ratio | 150° C. HTHP, cm³ Total | Free Water |
|---|---|---|---|
| Octadecyl | 2/1 | 26 | — |
| Octadecyl | 2.2/1 | 8.8 | — |
| Octadecyl | 3/1 | 3.6 | — |
| Octadecyl | 4/1 | 10.0 | — |
| Octadecyl | 5/1 | 6.4 | — |

Table 7 shows the results of fluid loss additives which were evaluated at a concentration of 12 lb/bbl in an oil-based invert emulsion mud having an 80:20 oil/water ratio, weighted to 12 lbs/gal, containing 2.7 gal/bbl of a primary emulsifier (oxidized tall oil); 17 lb/bbl of alkaline earth oxide; 0.72 gal/bbl of a secondary emulsifier (polyamide type); 4.5 lb/bbl of an organophilic clay. The oil phase was #2 diesel oil and the water phase was a 30 percent by weight calcium chloride brine solution. The drilling fluids were mixed 30 minutes on a Gifford-Wood homogenizer mixer. The mud samples were hot rolled for 64 hours at 200° C. before determining API, RP 13B 30 minute fluid loss at 150° C. and 500 psi.

TABLE 7

FILTRATION CONTROL PROPERTIES OF 80:20, 12 LB/GAL DIESEL OIL MUDS USED TO EVALUATE SAMPLES PYROLYZED AT 200° C.

| Amine | Leonardite/Amine Ratio | 150° C. HTHP, cm³ Total | Free Water |
|---|---|---|---|
| Tallow | 3/1 | 6.8 | — |
| Oleyl | 3/1 | 3.2 | — |
| Tall Oil | 3/1 | 3.6 | — |
| Soya | 3/1 | 2.4 | — |
| Hydrogenated Tallow | 3/1 | 11.6 | — |
| Vegetable | 3/1 | 2.4 | — |
| Coco | 3.9/1 | 17.2 | — |
| Dodecyl | 4.5/1 | 16.8 | — |

The data contained in Table 8 indicate the effects of reaction parameters of time and temperature on mud performance of the pyrolysis products. All of the products were prepared by the pyrolysis of an octadecylamine salt of leonardite containing a 3/1 ratio (dry weight basis) of leonardite to amine. The 300° C. pyrolysis data indicate that a decomposition point was reached between a reaction time of 3 and 4 hours. Data are also listed for performance of the salt before pyrolysis.

Table 8 shows the results of fluid loss additives which were evaluated at a concentration of 12 lb/bbl in an oil-based invert emulsion mud having an 80:20 oil/water ratio weighted to 12 lbs/gal containing 2.7 gal/bbl of a primary emulsifier (oxidized tall oil); 17 lb/bbl of alkaline earth oxide; 0.72 gal/bbl of a secondary emulsifier (polyamide type); 4.5 lb/bbl of an organophilic clay. The oil phase was a #2 diesel oil and the water phase was a 30 percent by weight calcium chloride brine solution. The drilling fluids were mixed 30 minutes on a Gifford-Wood homogenizer mixer. The mud samples were hot rolled for 64 hours at 200° C. before determining API, RP 13B 30 minute fluid loss at 150° C. and 500 psi (except as noted).

TABLE 8
EFFECTS OF REACTION PARAMETER VARIATIONS ON FILTRATION CONTROL PROPERTIES OF 80:20, 12 LB/GAL DIESEL OIL MUDS FORMULATED WITH PYROLYSIS PRODUCTS

| Pyrolysis Time Hr. | Pyrolysis Temp. °C. | 150° C. HTHP, $cm^3$ Total | Free Water |
|---|---|---|---|
| 16 | 160 | 6.0 | — |
| 24 | 160 | 5.6 | — |
| 8 | 200 | 5.2 | — |
| 12 | 200 | 5.2 | — |
| 14 | 200 | 3.2 | — |
| 24 | 200 | 2.8 | — |
| 2 | 300 | 4.4 | — |
| 3 | 300 | 3.2 | — |
| 4 | 300 | 5.6 | — |
| salt before pyrolysis | | 52* | |

*20 min. HTHP

Whereas the pyrolysis products described in Tables 5 to 8 were made by first preparing the amine salt followed by salt pyrolysis, the filtration control products of Tables 9 and 10 were prepared by pyrolysis of a mixture of the preferred amine and leonardite.

Table 9 shows the results of fluid loss additives which were evaluated at a concentration of 20 lb/bbl in an oil-based invert emulsion mud having an 80:20 oil/water ratio weighted to 12 lbs/gal containing 1.2 gal/bbl of a primary emulsifier (oxidized tall oil); 4 lb/bbl of alkaline earth oxide; 0.72 gal/bbl of a secondary emulsifier (polyamide type); 3.5 lb/bbl of an organophilic clay. The oil phase was #2 diesel oil and the water phase was a 30 percent by weight calcium chloride brine solution. The drilling fluids were mixed 30 minutes on a Gifford-Wood homogenizer mixer. The mud samples were hot rolled for 64 hours at 200° C. before determining API, RP 13B 30 minute fluid loss at 200° C. and 500 psi.

TABLE 9
PERFORMANCE COMPARISON OF PYROLYZED SALT AND A PRIOR ART PRODUCT AT 20 LB/BBL

| Product | Hours Hot Rolled @ 200° C. | 200° C. HTHP, $cm^3$ Total | Free Water |
|---|---|---|---|
| Pyrolyzed Salt | 16 | 4.8 | none |
| | 64 | 5.2 | none |
| Prior Art Product* | 16 | 7.6 | none |
| | 64 | 52 | |

*a known oil-dispersible lignite derivative

Because of the low HTHP filtrate volumes of Table 9 the additive concentration was reduced to demonstrate product effectiveness.

Table 10 shows the results of fluid loss additives which were evaluated at a concentration of 7.5 lb/bbl in an oil-based invert emulsion mud having an 80:20 oil/water ratio weighted to 12 lbs/gal containing 1.2 gal/bbl of a primary emulsifier (oxidized tall oil); 4 lb/bbl of alkaline earth oxide; 0.72 gal/bbl of a secondary emulsifier (polyamide type); 2.5 lb/bbl organophilic clay for diesel oil muds or 4.5 lb/bbl of an organophilic clay for mineral oil muds. The oil phase was a low toxicity mineral oil or #2 diesel oil and the water phase was a 30 percent by weight calcium chloride brine solution. The drilling fluids were mixed 30 minutes on a Gifford-Wood homogenizer mixer. The mud samples were hot rolled for 64 hours at 200° C. before determining API, RP 13B 30 minute fluid loss at 200° C. and 500 psi.

TABLE 10
PERFORMANCE COMPARISON OF PYROLYZED SALT AND A PRIOR ART PRODUCT AT 7.5 LB/BBL

| Product | Hours Hot Rolled @ 200° C. | 200° C. HTHP, $cm^3$ Total | Free Water |
|---|---|---|---|
| Diesel Oil | | | |
| Pyrolyzed Salt | initial | 22 | none |
| | 16 | 6.8 | none |
| | 64 | 28 | none |
| Prior Art Product* | initial | 15.2 | none |
| | 16 | 22 | none |
| | 64 | 98 | 0.4 |
| Mineral Oil | | | |
| Pyrolyzed Salt | initial | 7.6 | none |
| | 64 | 36 | none |
| Prior Art Product* | initial | 12.4 | none |
| | 64 | 104 | 1.6 |

*a known oil-dispersible lignite derivative

Tables 9 and 10 present the results of 200° C. HTHP testing. Most importantly, the performance of a conventional existing product which was termed an oil-dispersible lignite derivative by its manufacturer and the pyrolyzed material of the present invention was compared. As indicated, the filtration control additives were evaluated at different concentrations.

The dry process was used to prepare the experimental filtration control additives in Tables 9 and 10. The pyrolysis products described in the other tables were made by first preparing the pre-reacted amine salt by the methanol slurry procedure and then pyrolyzing the amine salt.

Although primary fatty amines are preferred for the preparation of the pyrolysis products, other amines such as secondary amines or primary amines having an alkyl-substituted phenyl radical may be used. Examples of these classes of amines are provided in Tables 11 and 12. The examples in Table 11 were made by pyrolysis of the previously prepared leonardite-amine salt while the products of Table 12 were made by pyrolysis of an amine-leonardite mixture. The dry weight ratio of leonardite to amine is indicated in the tables.

The filtration control additives listed in Tables 11 and 12 were evaluated at a concentration of 7.5 lb/bbl in an oil-based invert emulsion mud having an 80:20 oil/water ratio weighted to 12 lbs/gal containing 1:2 gal/bbl primary emulsifier (oxidized tall oil); 4 lb/bbl alkaline earth oxide; 0.72 gal/bbl of secondary emulsifier (polyamide type); and 2.5 lb/bbl of an organophilic clay. The oil phase was #2 diesel oil and the water phase was a 30 percent by weight calcium chloride brine solution. The drilling fluids were mixed for 30 minutes on a Gifford-Wood homogenizer mixer. The mud samples were hot rolled for 64 hours at 200° C. before determining API, RP 13B 30 minute fluid loss at 150° C. and 500 psi.

TABLE 11

FILTRATION CONTROL PROPERTIES OF 80:20, 12 LB/GAL DIESEL OIL MUDS USED TO EVALUATE SAMPLES PYROLYZED AT 200° C.

| Amine | Leonardite/Amine Ratio | 150° C. HTHP Total | Free Water |
|---|---|---|---|
| Dioctylamine | 3.4/1 | 90 | 8.4 |
| N—Methyloctadecyl | 3/1 | 48 | None |

TABLE 12

FILTRATION CONTROL PROPERTIES OF 80:20, 12 LB/GAL DIESEL FILTRATION CONTROL OIL MUDS USED TO EVALUATE SAMPLES PYROLYZED AT 200° C.

| Amine | Leonardite/Amine Ratio | 150° C. HTHP Total | Free Water |
|---|---|---|---|
| Dihydrogenated Tallow | 3/1 | 48 | None |
| 4-Tetradecylaniline | 2.9/1 | 6.4 | None |

The results presented in Table 13 demonstrate the improved performance (decreased HTHP filtrate volumes) of the additives when the amine-leonardite salts were pyrolyzed in a carbon dioxide atmosphere rather than a nitrogen atmosphere. These products were made by intermixing leonardite and amine in a 3:1 dry weight ratio. The mixtures were pyrolyzed in a 200° C. oven for 16 hours. The fluid loss additives were evaluated at a concentration of 7.5 lb/bbl in an oil-based invert emulsion mud having an 80:20 oil/water ratio weighted to 12 lbs/gal containing 1.2 gal/bbl of primary emulsifier (oxidized tall oil); 4 lb/bbl of alkaline earth oxide; 0.72 gal/ggl of a secondary emulsifier (polyamide type); 2.5 lb/bbl of an organophilic clay. The oil phase was #2 diesel oil and the water phase was a 30% by weight calcium chloride brine solution. The drilling fluids were mixed for 30 minutes on a Gifford-Wood homogenizer mixer. The mud samples were hot rolled at the given time and temperature before determining API, RP 13B 30 minute fluid loss at 200° C. and 500 psi.

TABLE 13

FILTRATION CONTROL PROPERTIES OF 80:20, 12 LB/BBL DIESEL OIL MUDS USED TO EVALUATE SAMPLES PYROLYZED UNDER NITROGEN OR CARBON DIOXIDE

| Product | Atmosphere | Hours Hot Rolled @ 200° C. | 200° C. HTHP cm$^3$ Total | Free Water |
|---|---|---|---|---|
| A | $N_2$ | Initial | 22 | None |
|   |   | 64 | 28 | None |
| B | $N_2$ | Inital | 38 | None |
|   |   | 64 | 16.4 | None |
| C | $CO_2$ | Initial | 12 | None |
|   |   | 64 | 6.4 | None |
| D | $CO_2$ | Initial | 14.4 | None |
|   |   | 64 | 9.6 | None |

Although the invention has been described in terms of the specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. The method of drilling a well into a subsurface formation in which a water-in-oil emulsion drilling fluid containing a filtrate control additive is circulated into, through, and out of said well, said filtrate control additive comprising: the pyrolyzed amine salts of humic acid obtained by intermixing and heating from about 185° C. to about the decomposition temperature of the resultant pyrolysis products for from between about three hours to about sixteen hours in an enclosed reaction chamber having a controlled inert gas atmosphere therewithin: (a) a finely-divided humic acid-containing material selected from the group consisting of leonardite and lignite; and (b) a primary amine having alkyl radicals ranging from ten to twenty carbon atoms, or a primary amine having one alkyl-substituted phenyl radical, the alkyl radical having ten to twenty carbon atoms, or a secondary amine having at least one alkyl radical of eight to twenty carbon atoms, the said pyrolyzed amine salts of humic acid having high thermal stability in such water-in-oil emulsion drilling fluid at a temperature of not less than about 230° C., said method comprising the steps of: (1) introducing into said well said water-in-oil emulsion drilling fluid; and (2) circulating said drilling fluid into, through, and out of said well.

* * * * *